(12) United States Patent
Jayasekara (10) Patent No.: US 7,005,242 B2
(45) Date of Patent: Feb. 28, 2006

(54) MAGNETIC HEAD AND METHOD OF MAKING THE SAME USING AN ETCH-STOP LAYER FOR REMOVING PORTIONS OF THE CAPPING LAYER

(75) Inventor: Wipul Pemsiri Jayasekara, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/104,877

(22) Filed: Mar. 22, 2002

(65) Prior Publication Data

US 2003/0179496 A1    Sep. 25, 2003

(51) Int. Cl.
*G03F 7/00* (2006.01)
(52) U.S. Cl. ..................... 430/320; 430/324
(58) Field of Classification Search ............... 430/320, 430/322, 323, 324
See application file for complete search history.

(56) References Cited

U.S. PATENT DOCUMENTS

| | | | |
|---|---|---|---|
| 5,256,249 A | 10/1993 | Hsie et al. | 216/47 |
| 5,363,265 A | 11/1994 | Hsie et al. | 360/113 |
| 5,855,056 A | 1/1999 | Cates | 29/603.14 |
| 5,861,328 A | 1/1999 | Tehrani et al. | 438/210 |
| 5,949,623 A | 9/1999 | Lin | 360/113 |
| 6,030,753 A | 2/2000 | Lin | 430/314 |
| 6,303,392 B1 | 10/2001 | Matsukuma | 438/3 |
| 6,325,900 B1 | 12/2001 | Komuro et al. | 204/192.2 |
| 6,327,107 B1 | 12/2001 | Komuro et al. | 360/55 |

*Primary Examiner*—Kathleen Duda
(74) *Attorney, Agent, or Firm*—Zilka-Kotab, PC (57) ABSTRACT

A read sensor and method of making the same using an etch-stop layer are disclosed. The method is particularly suitable in connection with techniques requiring the partial removal of the capping layer, such as exchange tab (ET) and lead overlay (LOL) techniques. Basically, a thin "etch-stop" layer is deposited over a top free layer of sensor materials. The etch-stop layer is made of a suitable material such as copper-oxide (CuO) or nickel-iron-chromium (NiFeCr). A tantalum (Ta) capping layer is then deposited over the etch-stop layer. When appropriate, top edge portions of the capping layer are exposed to a reactive ion etch (RIE) using a fluorine gas for removal. Advantageously, the etch-stop layer significantly reduces or eliminates damage to the free layer that would otherwise occur due to the fluorine gas RIE.

15 Claims, 7 Drawing Sheets

MAGNETIC HEAD AND METHOD OF MAKING THE SAME USING AN ETCH-STOP LAYER FOR REMOVING PORTIONS OF THE CAPPING LAYER

BACKGROUND OF THE INVENTION

1. Field of the Invention

This invention relates generally to magnetic heads and methods of making the same, and more particularly to read sensors and methods of making the same using an etch-stop layer between the capping layer and the free layer so that when portions of the capping layer are removed via a reactive ion etch (RIE), damage to the free layer that would otherwise occur is reduced or eliminated.

2. Description of the Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., Ni—Fe) separated by a layer of non-magnetic material (e.g., Cu) are generally referred to as spin valve (SV) sensors manifesting the GMR effect (also referred to as the SV effect). In an SV sensor, one of the ferromagnetic layers, referred to as the pinned layer, has its magnetization typically pinned by exchange coupling with an antiferromagnetic (e.g., NiO or Fe—Mn) layer. The magnetization of the other ferromagnetic layer, referred to as the freelayer, however, is not fixed and is free to rotate in response to the field from the recorded magnetic medium (the signal field). In the SV sensor, the SV effect varies as the cosine of the angle between the magnetization of the pinned layer and the magnetization of the freelayer. Recorded data can be read from a magnetic medium because the external magnetic field from the recorded magnetic medium (the signal field) causes a change in direction of magnetization in the freelayer, which in turn causes a change in resistance of the SV sensor and a corresponding change in the sensed current or voltage.

Figure 1:
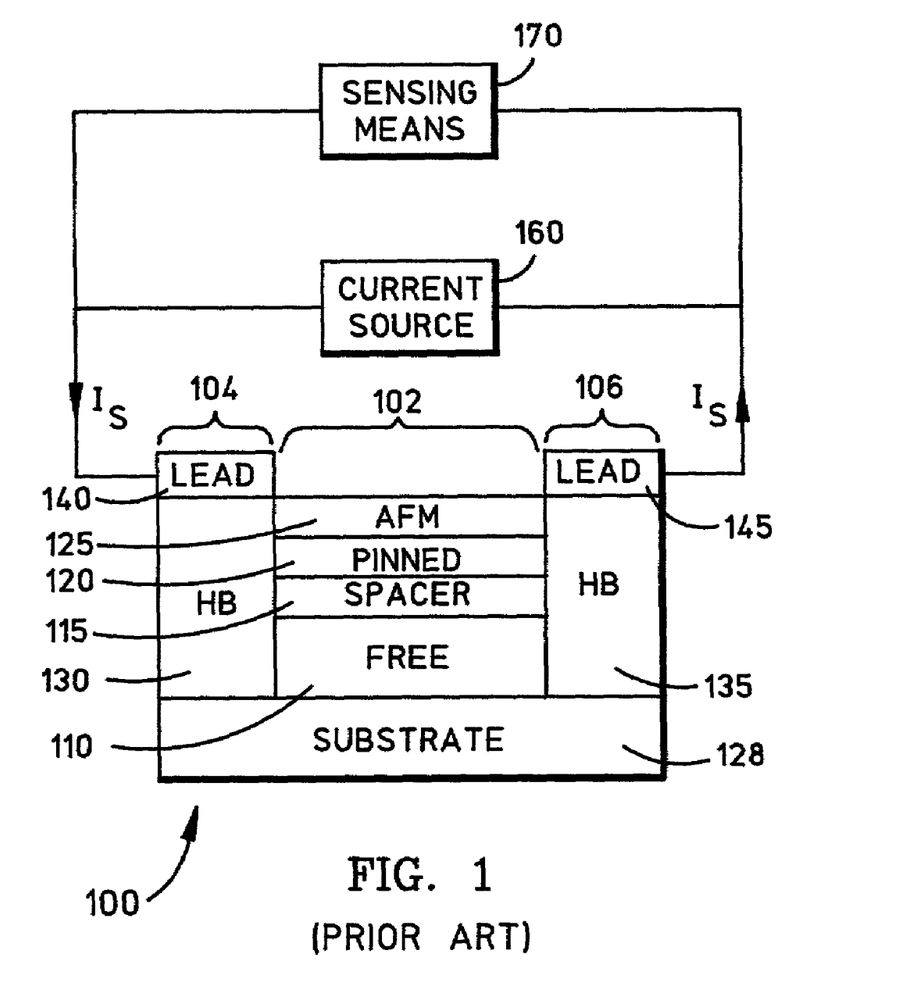
FIG. 1 is an air bearing surface (ABS) view, not to scale, of a prior art read sensor.

FIG. 1 shows a prior art SV sensor 100 comprising end regions 104 and 106 separated from each other by a central region 102. A freelayer (free ferromagnetic layer) 110 is separated from a pinned layer (pinned ferromagnetic layer) 120 by a non-magnetic, electrically-conducting spacer 115. The magnetization of the pinned layer 120 is fixed by an antiferromagnetic (AFM) layer 125. Freelayer 110, spacer 115, pinned layer 120 and the AFM layer 125 are all formed in the central region 102. Hard bias layers 130 and 135 formed in the end regions 104 and 106, respectively, provide longitudinal bias for the freelayer 110. Leads 140 and 145 formed over hard bias layers 130 and 135, respectively, provide electrical connections for the flow of the sensing current $I_s$ from a current source 160 to the MR sensor 100. Sensing means (a detector) 170 connected to leads 140 and 145 senses (detects) the change in the resistance due to changes induced in the freelayer 110 by the external magnetic field (e.g., field generated by a data bit stored on a disk).

Another type of SV sensor is an antiparallel (AP) pinned SV sensor. In AP-pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-pinned SV sensor provides improved exchange coupling of the antiferromagnetic (AFM) layer to the laminated pinned layer structure than is achieved with the pinned layer structure of the SV sensor of FIG. 1. This improved exchange coupling increases the stability of the AP-pinned SV sensor at high temperatures which allows the use of corrosion resistant antiferromagnetic materials such as NiO for the AFM layer.

Figure 2:
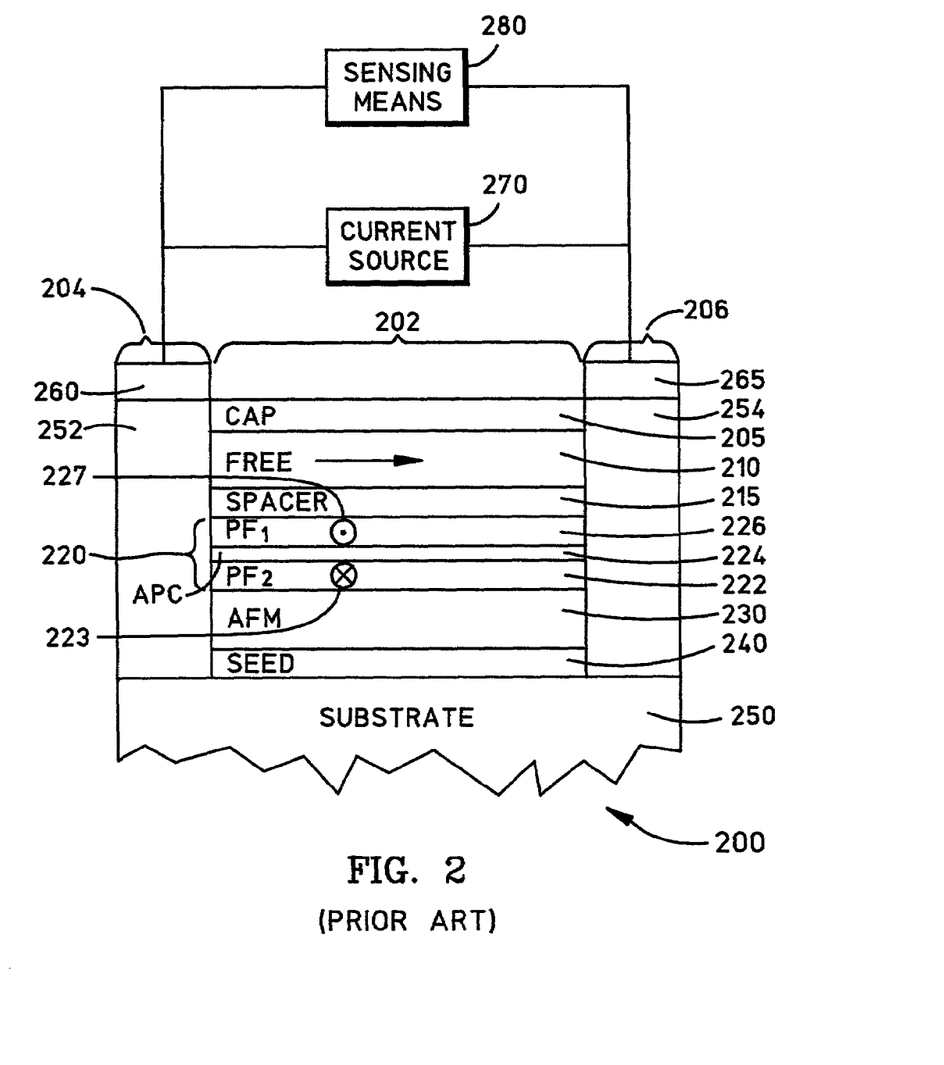
FIG. 2 is an ABS view, not to scale, of a prior art AP-pinned read sensor.

FIG. 2 shows a prior art AP-pinned SV sensor 200 comprising end regions 204 and 206 separated from each other by a central region 202. A freelayer 210 is separated from a laminated AP-pinned layer structure 220 by a non-magnetic, electrically-conducting spacer layer 215. The magnetization of the laminated AP-pinned layer structure 220 is fixed by an AFM layer 230. The laminated AP-pinned layer structure 220 comprises a first ferromagnetic layer 222 and a second ferromagnetic layer 226 separated by an antiparallel coupling (APC) layer 224 of nonmagnetic material. The two ferromagnetic layers 222, 226 (PF1 and PF2) in the laminated AP-pinned layer structure 220 have their magnetization directions oriented antiparallel, as indicated by the arrows 223, 227 (arrows pointing into and out of the plane of the paper respectively). The AFM layer 230 is formed on a seed layer 240 deposited on the substrate 250. To complete the central region 202 of the SV sensor, a capping layer 205 (e.g., tantalum) is formed on the freelayer 210. Some conventional read sensors utilize a layer of copper-oxide (CuO) in between the capping layer and the free layer to improve sensor performance. Hard bias layers 252 and 254 formed in the end regions 204 and 206, respectively, provide longitudinal bias for the freelayer 210. Leads 260, 265 provide electrical connections for the flow of the sensing current $I_s$ from a current source 270 to the SV sensor 200. Sensing means 280 connected to leads 260, 265 senses the change in the resistance due to changes induced in the freelayer 210 by the external magnetic field (e.g., field generated by a data bit stored on a disk).

As apparent, multiple thin film layers are patterned to form various shaped layers in the head. Some of these layers are plated while other layers are sputter deposited on a wafer substrate. The read head portion of a magnetic head assembly includes multiple layers that are typically sputter-deposited. For example, the multiple layers of a read sensor, hard bias and lead layers connected to the read sensor, and first and second read gap layers below and on top of the read sensor are typically sputter deposited.

One prior art method of forming shaped sputter deposited layers is to sputter deposit a full film layer of the required material on a wafer substrate, form a patterned photoresist layer on the layer, ion mill away the exposed portion of the layer and then remove the photoresist layer leaving the desired shaped layer that was protected therebelow. This first conventional method of shaping sputter deposited layers has been generally superseded by a second conventional method which utilizes a bilayer lift-off mask scheme.

The lift-off mask used in the second conventional method has a T-shape (as seen in cross-section) wherein the vertical portion of the T is short and wide but less wide than the horizontal top portion of the T. The top portion of the T is generally a patterned photoresist layer and the bottom vertical portion of the T is a release layer. This configuration provides left and right undercuts (as seen in cross-section) wherein each undercut has a height and a length below the top photoresist portion. In this method, the lift-off mask is employed for the purpose of making contiguous junctions (CJs) of the left and right lead layers with left and right side edges respectively of the read sensor.

Multiple read sensor layers are sputter deposited in full film on the wafer substrate followed by formation of the lift-off mask covering a read sensor site. Ion milling is then employed to remove all of the read sensor material except that below the mask. Full films of hard bias and lead layer materials are then sputter deposited which cover the top of the lift-off mask and an area surrounding the lift-off mask. It is important that the height and length of the undercuts is sufficient such that a photoresist stripper can reach the bottom release layer. The stripper is then introduced to dissolve the bottom release layer after the hard bias and lead layer depositions. This causes the lift-off mask and the hard bias and lead materials deposited thereon to be released from the wafer substrate leaving the aforementioned contiguous junctions between the left and second right layers and the left and right side edges respectively of the read sensor.

Several variations of this method are being developed. Two main approaches are an Exchange Tabs (ET) technique and a Lead Overlay (LOL) technique. In the ET technique, an exchange biasing "tab" is basically placed on both sides of the GMR sensor's free layer to define the magnetic track width of the sensor. To begin, a GMR film is deposited and then a lift-off mask is formed in a central region over the GMR film. With the lift-off mask in place, the capping layer (e.g. tantalum) and part of the free layer are etched in end regions which surround the central region. Next, left and right exchange layers are deposited together in the end regions which is followed by the deposition of left and right lead layers. Deposition of the left and right exchange layers may be preceded by the deposition of left and right ferromagnetic layers. The lift-off mask is subsequently removed to thereby form the read sensor.

In the LOL technique, a first lift-off mask is formed in the central region over the GMR layers and sensor materials not protected by the lift-off mask are removed. Left and right hard bias layers are then deposited together in the end regions (optionally with a capping layer). Next, the first lift-off mask is removed, and a second lift-off mask having a narrower structure than the first is formed in the central region. Those portions of the sensor that are exposed (e.g. top edges of the sensor's tantalum capping layer) are slightly etched to remove any tantalum-oxide (TaOx) or other highly resistive material on top of the sensor. The oxide is undesirably formed due to the exposure to open air and annealing processes used. Left and right lead layers are then deposited in the end regions. A read sensor is formed such that edges of the left and the right lead layers are positioned on top of the edges of the sensor to define the magnetic track width.

In each one of these techniques, it is necessary to remove a portion of the capping layer without causing damage to the underlying sensor ferromagnetic material. Furthermore, this removal needs to be done at the junction area which is heavily shadowed by the lift-off mask structure.

Figure 3:
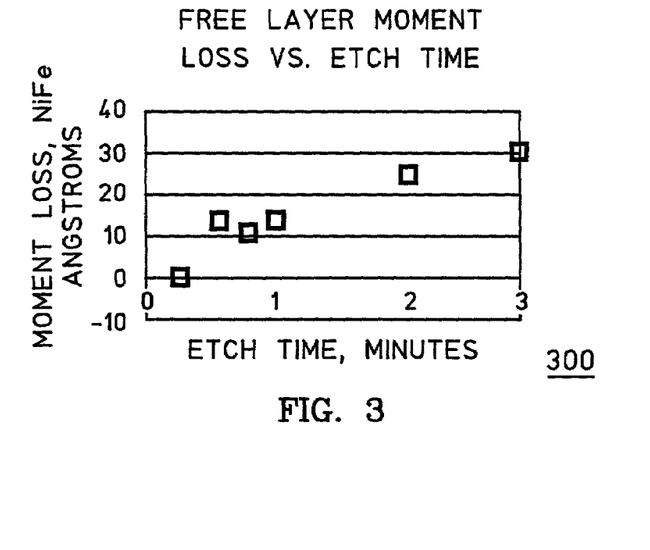
FIG. 3 is a graph which shows the free layer moment loss vs. capping layer etch time.

It has been observed that physical ion milling is not ideal for this task since long "tails" of the capping layer remain in the junction area even though they are removed in the field area. On the other hand, it has been observed that an etching mechanism such as reactive ion etching (RIE) desirably exhibits selectivity between the capping layer (Ta/TaOx) and the underlying ferromagnetic material. Thus, the RIE appears to be particularly suited for this application. However, a RIE with fluorine chemistry undesirably causes damage to the underlying free layer. FIG. 3 is a graph 300 which shows the free layer moment loss vs. capping layer etch time. As apparent, the free layer moment loss dramatically increases as the etching time increases.

Accordingly, there is a resulting need for a method and device which cause little or no damage to the underlying free layer when portions of the capping layer are removed via etching.

SUMMARY OF THE INVENTION

A read sensor of a magnetic head and method of making the same using an "etch-stop" layer are disclosed. The invention is particularly suitable in connection with techniques requiring the partial removal of the capping layer, such as exchange tab (ET) or lead overlay (LOL) techniques. In one illustrative embodiment, a thin etch-stop layer made of, for example, copper-oxide or nickel-iron-chromium, is deposited over a top free layer of sensor materials. A capping layer made of tantalum is then deposited over the etch-stop layer. When appropriate, top edge portions of the capping layer are etched for removal. Advantageously, the etch-stop layer reduces or eliminates damage to the free layer that would otherwise occur from the etching. Preferably, the etching is a reactive ion etch (RIE) using a fluorine gas.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 4:
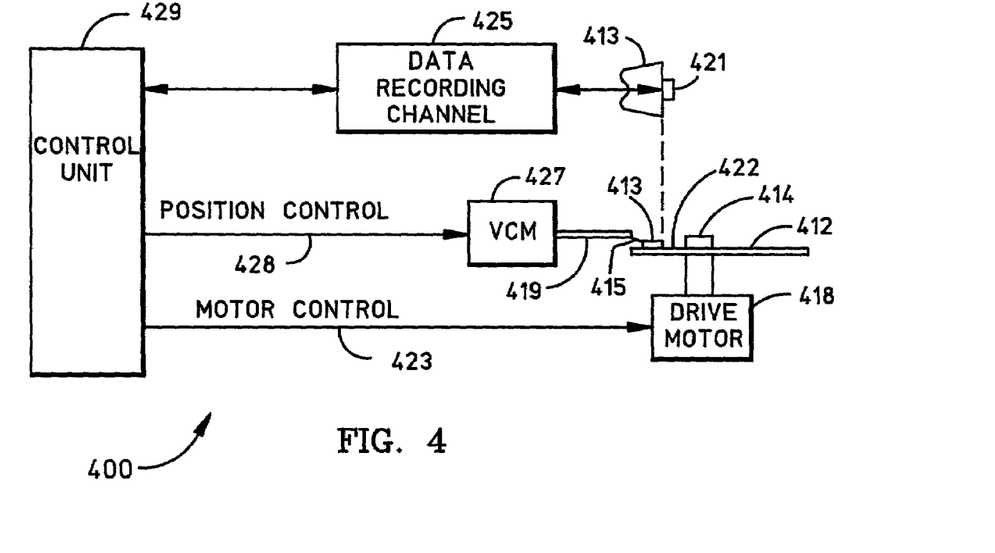
FIG. 4 is a simplified drawing of a magnetic recording disk drive system.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording media on each disk is in the form of an annular pattern of concentric data tracks (not shown) on disk 412.

At least one slider 413 is positioned on the disk 412, each slider 413 supporting one or more magnetic read/write heads 421 where the head 421 incorporates the MR sensor of the present invention. As the disks rotate, slider 413 is moved radially in and out over disk surface 422 so that heads 421 may access different portions of the disk where desired data is recorded. Each slider 413 is attached to an actuator arm 419 by means of a suspension 415. The suspension 415 provides a slight spring force which biases slider 413 against the disk surface 422. Each actuator arm 419 is attached to an actuator means 427. The actuator means as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 (the surface of slider 413 which includes head 421 and faces the surface of disk 412 is referred to as an air bearing surface (ABS)) and disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write heads 421 by means of recording channel 425.

The above description of a typical magnetic disk storage system, and the accompanying illustration of FIG. 4 are for representation purposes only. It should be apparent that disk storage systems may contain a large number of disks and actuators, and each actuator may support a number of sliders.

Figure 5:
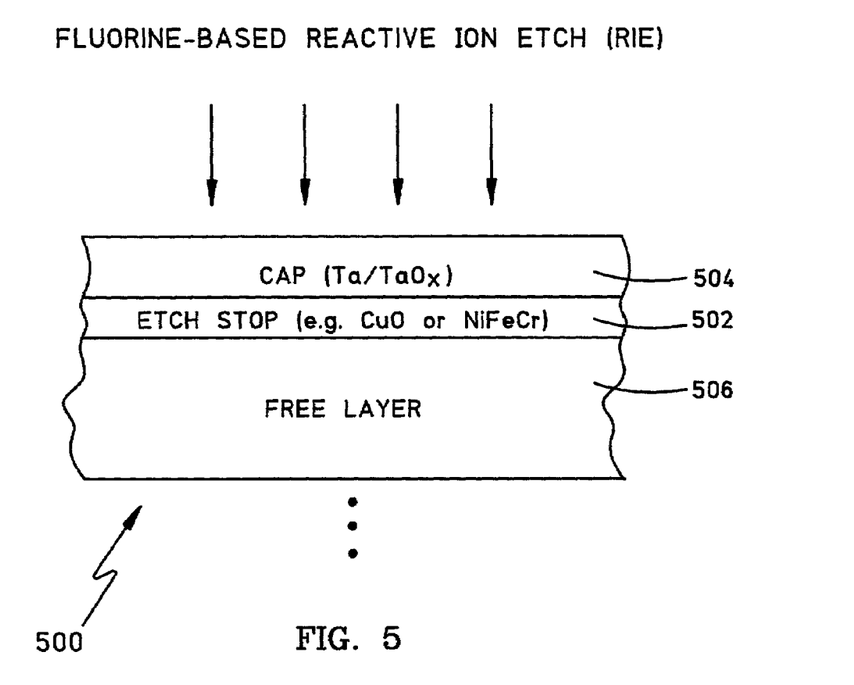
FIG. 5 is a partial ABS view of a read sensor having an etch-stop layer in between the capping layer and the free layer of the sensor, wherein the capping layer is subjected to a fluorine-based reactive ion etch (RIE) to remove portions thereof.

FIG. 5 is a partial ABS view of a read sensor 500 for an abbreviated discussion of the present method and structure. Basically, the invention utilizes an etch-stop layer 502 in between a capping layer 504 and a free layer 506 of the sensor. During formation of the read sensor, portions of capping layer 504 are etched for removal. Advantageously, the use of etch-stop layer 502 reduces or eliminates damage to free layer 506 that would otherwise occur from the etch. The capping layer removal may be done in order to remove any oxides formed on or in capping layer 504. If the capping layer is made of tantalum (Ta), for example, the etching may be done in order to remove tantalum-oxide (TaOx) or other highly-resistive materials on top of capping layer 504.

Figure 8:
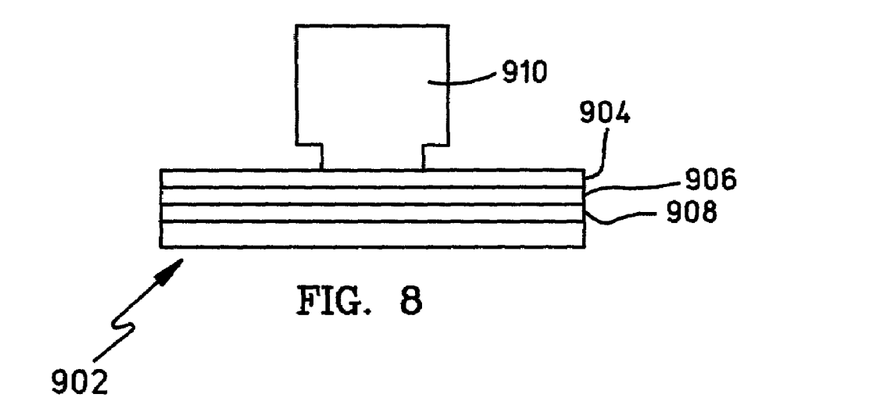
FIGS. 8–9 are illustrations depicting the formation of a read sensor with the etch-stop layer using an exchange tabs (ET) technique.
Figure 10:
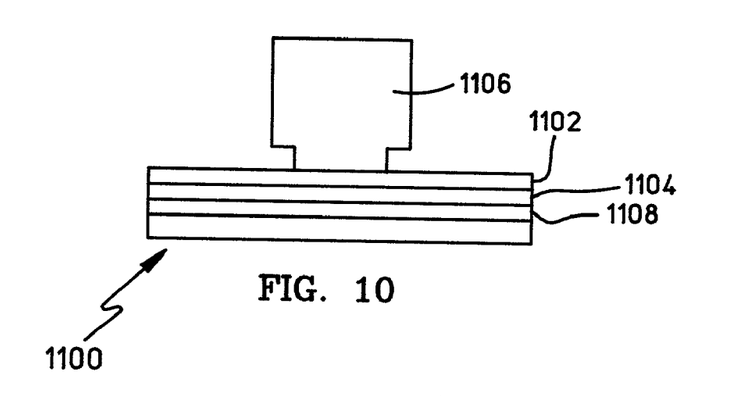
FIGS. 10–12 are illustrations depicting the formation of a read sensor with the etch-stop layer using a lead overlay (LOL) technique.
Figure 11:
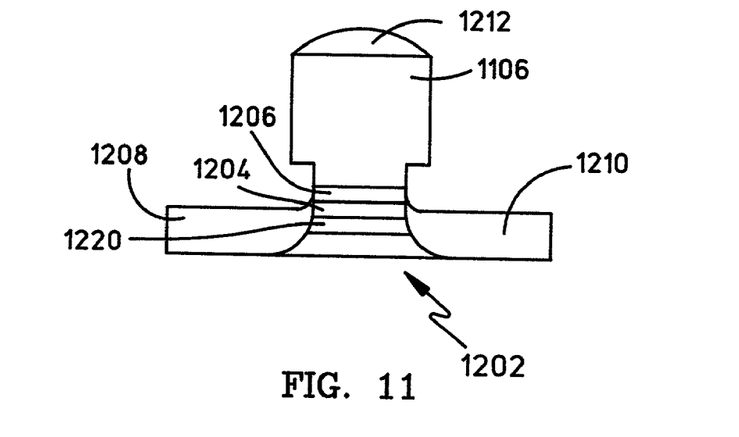

Preferably, the etch-stop layer technique is used along with the exchange tabs (ET) process and the lead overlay (LOL) process of forming read sensors, described in the Background section and later described in relation to FIGS. 8–9 (ET process) and FIGS. 10–12 (LOL process).

Etch-stop layer 502 is a layer of material that is generally resistant to the etch and is at least somewhat conductive. Put another way, etch-stop layer 502 is not etchable very easily and has a better selectivity as compared to capping layer 504. Etch-stop layer 502 does not degrade or significantly degrade the performance of the read sensor, and may in fact enhance the sensor's performance. Preferably, etch-stop layer 502 is made of copper-oxide (CuO) or nickel-iron-chromium (NiFeCr), but any suitable material may be utilized.

An etch-stop layer 502 made of copper-oxide may be applied to a thickness between about 3–30 Angstroms, and in this particular embodiment has a thickness of about 10 Angstroms. A capping layer 504 made of tantalum (Ta) may be applied to a thickness of between about 20–100 Angstroms, and in this particular embodiment has a thickness of about 40 Angstroms. A free layer 506, which may be made of nickel-iron (NiFe), cobalt (Co), cobalt-iron (CoFe), a combination of these materials, or an alloy based upon these materials, is applied to a thickness of between about 10–100 Angstroms. In this particular embodiment, free layer 506 has a thickness of about 30 Angstroms. Alternatively, free layer 506 may be an antiferromagnetically (AP) coupled tri-layer.

Preferably, the etch is a reactive ion etch (RIE) using a suitable etch gas such as one containing fluorine (e.g., $CHF_3$, $C_3F_8$, or $CF_4$). However, other suitable etching techniques or gases may be utilized. Alternatively, for example, ion milling may be suitable for etching capping layer 504.

Figure 6:
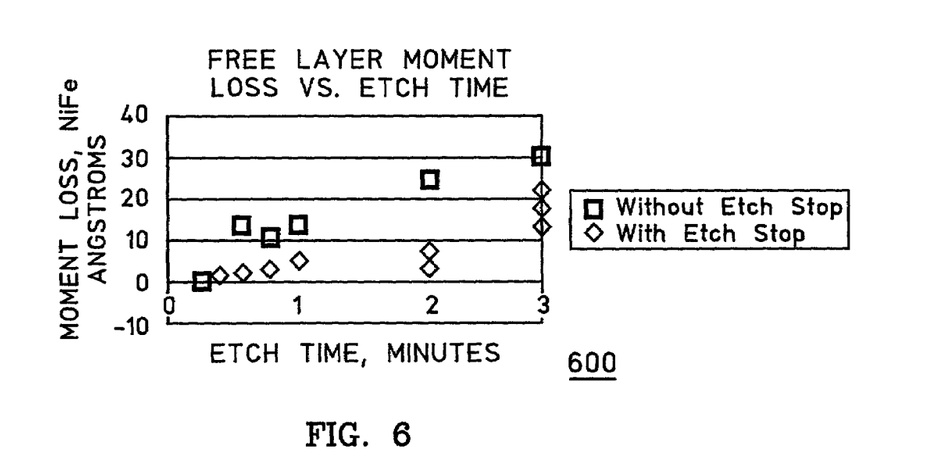
FIG. 6 is a graph which shows the free layer moment loss vs. capping layer etch time with use of the etch-stop layer of the present invention.

As stated above, the use of etch-stop layer 502 reduces or eliminates damage to free layer 506 that would otherwise occur from the etching. To illustrate, FIG. 6 shows a graph 600 depicting the free layer moment loss vs. capping layer etch time with use of the etch-stop layer. The data shown on this graph 600 were generated based on a read sensor having an etch-stop layer made of copper-oxide (CuO), a capping layer made of tantalum (Ta), and a reactive ion etch (RIE) using a fluorine gas. As apparent from graph 600, the etch-stop layer significantly reduces the free layer moment loss caused by the fluorine-based RIE, and results in a large process window for the cap layer removal process.

Figure 7:
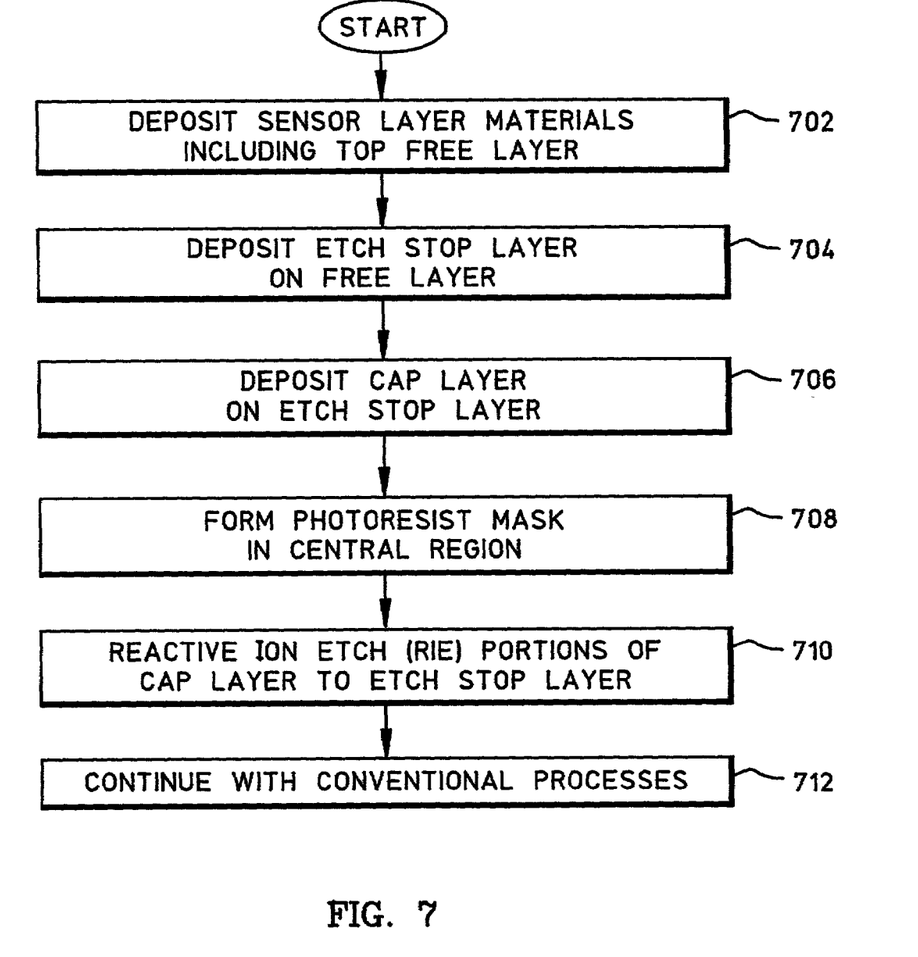
FIG. 7 is a flowchart describing a method of forming a read sensor with use of the etch-stop layer.

FIG. 7 is a flowchart describing the basic method of forming a read sensor with use of an etch-stop layer. First, a full layer of GMR sensor materials are deposited over a substrate (step 702). At this point, the top layer of sensor materials is the free layer. Next, an etch-stop layer is deposited on top of the free layer (step 704). Preferably, the etch-stop layer is made of copper-oxide (CuO). A capping layer is then deposited on top of the etch-stop layer (step 706). Preferably, the capping layer is made of tantalum (Ta). A photoresist or lift-off mask is then formed in a central region over the resulting structure (step 708).

Portions of the capping layer will need to be removed at some point depending on the particular process being utilized. To accomplish this, top edge portions of the structure are exposed to a reactive ion etch (RIE) using a fluorine gas (e.g., $CHF_3$, $C_3F_8$, or $CF_4$) (step 708). Only the top edge portions are exposed since the photoresist mask is in place in the central region. Preferably, the RIE is performed until the capping layer portions are removed to expose the underlying etch-stop layer. The RIE may be done in order to remove any tantalum-oxide (TaOx) or other highly-resistive materials on top of the read sensor. Formation of the read sensor may be completed using well-known conventional processes (step 710).

As described earlier, the method is particularly suitable in connection with techniques requiring the partial removal of the capping layer. Two such methods are the exchange tab (ET) technique and the lead overlay (LOL) technique. FIGS. 8–9 are illustrations depicting the formation of a read sensor with the etch-stop layer using an exchange tabs (ET) technique, and FIGS. 10–12 are illustrations depicting the formation of a read sensor with the etch-stop layer using a lead overlay (LOL) technique.

In the ET technique, an exchange biasing "tab" is basically formed on both sides of the GMR sensor's free (or sense) layer. Beginning with FIG. 8, a GMR film 902 having an etch-stop layer 906 (e.g. copper-oxide) between a free layer 908 (e.g. nickel-iron) and a capping layer 904 (e.g. tantalum) is deposited. A photoresist or lift-off mask 910 is then formed in a central region over GMR film 902. With lift-off mask 910 in place, portions of capping layer 904 are etched (e.g. using the fluorine-based RIE) in end regions which surround the central region. The etching is done until most if not all of capping layer 904 in the end regions is removed and the underlying etch-stop layer 906 is exposed. The entire etch-stop layer 906 in the end regions may be removed with a light ion milling process.

Figure 9:
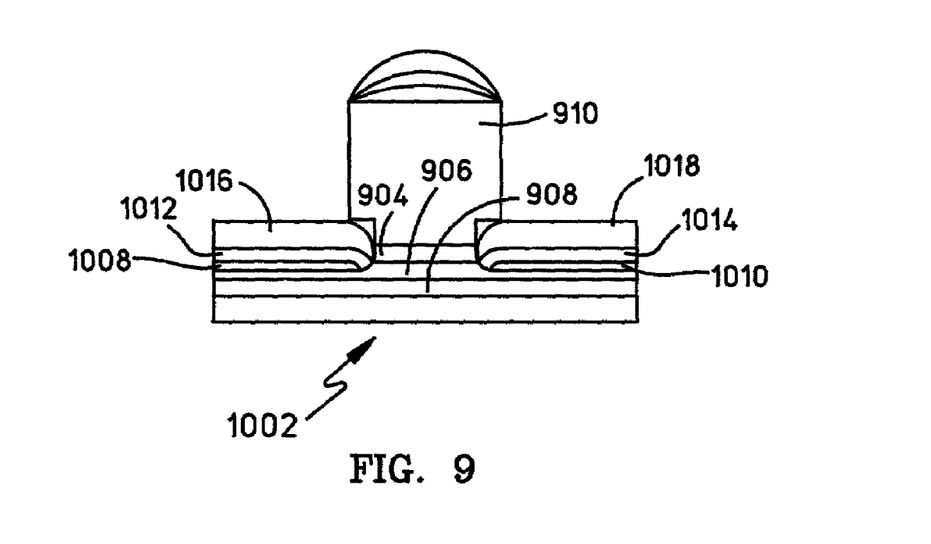

In FIG. 9, the ET technique continues where left and right exchange layers 1012 and 1014 are deposited together in the end regions followed by the simultaneous deposition of left and right lead layers 1016 and 1018. Deposition of the left and right exchange layers 1012 and 1014 may be preceded by the deposition of left and right ferromagnetic layers 1008 and 1010. Lift-off mask 910 is subsequently removed to thereby form a read sensor 1002. Using this process, good magnetic contact is made between left and right exchange layers 1012 and 1014 and free layer 908. Advantageously, using etch-stop layer 906 significantly reduces or eliminates damage to free layer 908 that would otherwise occur from the etching during the ET process.

In the LOL technique, two lift-off masks may be utilized to form the read sensor. Beginning with FIG. 10, a GMR film 1100 having an etch-stop layer 1104 (e.g. copper-oxide) between a free layer 1108 (e.g. nickel-iron) and a capping layer 1102 (e.g. tantalum) is deposited. A first photoresist or lift-off mask 1106 is then formed in a central region over GMR film 1100. Sensor materials not protected by first lift-off mask 1106 in the end regions are removed to generally form a central read sensor 1202 shown in FIG. 11. Read sensor 1202 now includes a central capping layer 1206, a central etch-stop layer 1204, and a central free layer 1220. Left and right hard bias layers 1208 and 1210 are then deposited together in the end regions (optionally along with a capping layer), and hard bias materials 1212 on top of lift-off mask 1106. First lift-off mask 1106 is then removed.

Figure 12:
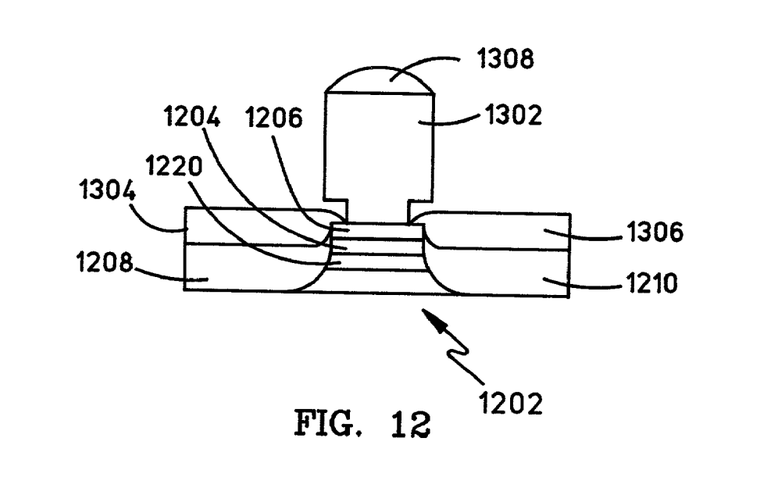

In FIG. 12, the LOL technique continues where a second lift-off mask 1302 having a narrower structure than the first is formed in the central region. Those portions of central read sensor 1202 that are exposed (i.e. the top edges of central capping layer 1206) are slightly etched (e.g. using the fluorine-based RIE) to remove any tantalum-oxide (TaOx) or other highly resistive material on top of the sensor. Left and right lead layers 1304 and 1306 are then deposited together in the end regions over left and right hard bias layers 1208 and 1210. As shown, central read sensor 1202 is formed such that edges of left and right lead layers 1304 and 1306 are positioned on top of the edges of the sensor to define the magnetic track width. Using this process, good electrical contact is made between left and right lead layers 1304 and 1306 and read sensor 1202. Advantageously, using etch-stop layer 1204 significantly reduces or eliminates damage to free layer 1220 that would otherwise occur from the etching during the LOL process.

Each resulting structure in FIG. 9 and FIG. 12 is read sensor which includes an etch-stop layer formed on the free layer and underneath a capping layer that has been partially subjected to a fluorine-based RIE.

Thus, a read sensor and method of making the same using an etch-stop layer have been described. The method is particularly suitable in connection with techniques requiring the partial removal of the capping layer, such as exchange tab (ET) and lead overlay (LOL) techniques. Basically, a thin etch-stop layer is deposited over a top free layer of sensor materials. The etch-stop layer is made of a suitable material such as copper-oxide (CuO) or nickel-iron-chromium (NiFeCr). A capping layer made of a suitable material such as tantalum (Ta) is then deposited over the etch-stop layer. When appropriate, top edge portions of the capping layer are exposed to a reactive ion etch (RIE) using a fluorine gas for removal. Advantageously, the etch-stop layer significantly reduces or eliminates damage to the free layer that would otherwise occur from the fluorine gas RIE.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of making a magnetic head, comprising:
   depositing an etch-stop layer over sensor materials which include a free layer;
   depositing a capping layer over the etch-stop layer;
   forming a lift-off mask in a central region over the capping layer, which exposes portions of the capping layer in end regions which surround the central region; and
   etching to remove the exposed portions of the capping layer, such that the etch-stop layer reduces damage to the free layer otherwise caused by the etching.

2. The method of claim 1, wherein the etch-stop layer comprises one of copper-oxide (CuO) and nickel-iron-chromium (NiFeCr).

3. The method of claim 1, wherein the capping layer comprises tantalum (Ta) which is partially removed by the act of etching.

4. The method of claim 1, wherein the act of etching comprises reactive ion etching (RIE).

5. The method of claim 1, wherein the act of etching comprises ion milling.

6. The method of claim 1,
wherein the lift-off mask comprises a photoresist.

7. The method of claim 1, further comprising an exchange tab (ET) technique which includes the acts of:
after the etching:
depositing left and right exchange layers in the end regions;
depositing left and right lead layers in the end regions over the left and rights exchange layers; and
removing the lift-off mask.

8. The method of claim 1, further comprising a lead overlay (LOL) technique which includes the acts of:
forming a first lift-off mask in a central region over the capping layer;
milling with use of the first lift-off mask to remove the sensor materials in the end regions which surround the central region, to thereby form a read sensor structure in the central region;
after the milling, depositing left and right hard bias layers in the end regions;
removing the first lift-off mask;
forming a second lift-off mask comprising the lift-off mask in the central region;
wherein the etching comprises etching with use of the second lift-off mask to remove the exposed portions of the capping layer on the read sensor structure;
after the etching:
removing the second-lift off mask; and
depositing left and right lead layers in the end regions over the left and right exchange layers.

9. A method of making a magnetic head, comprising:
depositing an etch-stop layer over sensor materials which include a top free layer;
depositing a capping layer over the etch-stop layer; and
reactive ion etching (RIE) portions of the capping layer, such that the etch-stop layer reduces damage to the free layer otherwise caused by the RIE.

10. The method of claim 9, wherein the capping layer comprises tantalum (Ta) and the act of RIE removes tantalum-oxide from the capping layer.

11. The method of claim 9, wherein the act of RIE utilizes a fluorine gas.

12. The method of claim 9, wherein the etch-stop layer comprises one of copper-oxide (CuO) and nickel-iron-chromium (NiFeCr).

13. The method of claim 9, further comprising:
forming a photoresist mask in a central region over the capping layer, which exposes the portions of the capping layer which are removed by the RIE.

14. The method of claim 9, further comprising an exchange tab (ET) technique which includes the acts of:
prior to the RIE:
forming a lift-off mask in a central region over the capping layer;
wherein the RIE comprises RIE with use of the lift-off mask to remove the capping layer in end regions which surround the central region;
after the RIE:
depositing left and right exchange layers in the end regions;
depositing left and right lead layers in the end regions over the left and right exchange layers; and
removing the lift-off mask.

15. The method of claim 9, further comprising a lead overlay (LOL) technique which includes the acts of:
prior to the RIE:
forming a first lift-off mask in a central region over the capping layer;
milling with use of the first lift-off mask to remove the sensor materials in end regions which surround the central region, to thereby form a read sensor in the central region;
after the milling, depositing left and right hard bias layers in the end regions;
removing the first lift-off mask;
forming a second lift-off mask in the central region;
wherein the RIE comprises RIE with use of the second lift-off mask to remove portions of the capping layer on the read sensor;
after the RIE:
removing the second-lift off mask; and
depositing left and right lead layers in the end regions over the left and right exchange layers.

* * * * *